April 8, 1958 V. E. CARBONARA 2,829,833
AZIMUTH COUNTER

Filed Jan. 13, 1954 4 Sheets-Sheet 1

INVENTOR.
VICTOR E. CARBONARA

BY
Ostrolenk & Faber
ATTORNEYS

April 8, 1958 V. E. CARBONARA 2,829,833
AZIMUTH COUNTER
Filed Jan. 13, 1954 4 Sheets-Sheet 2
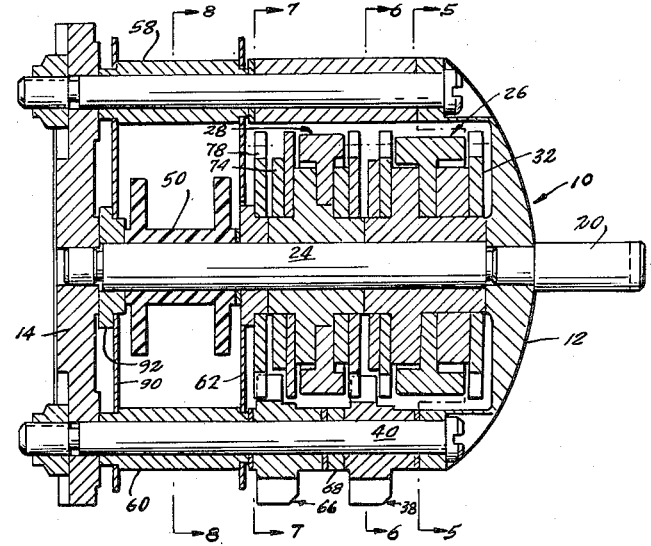
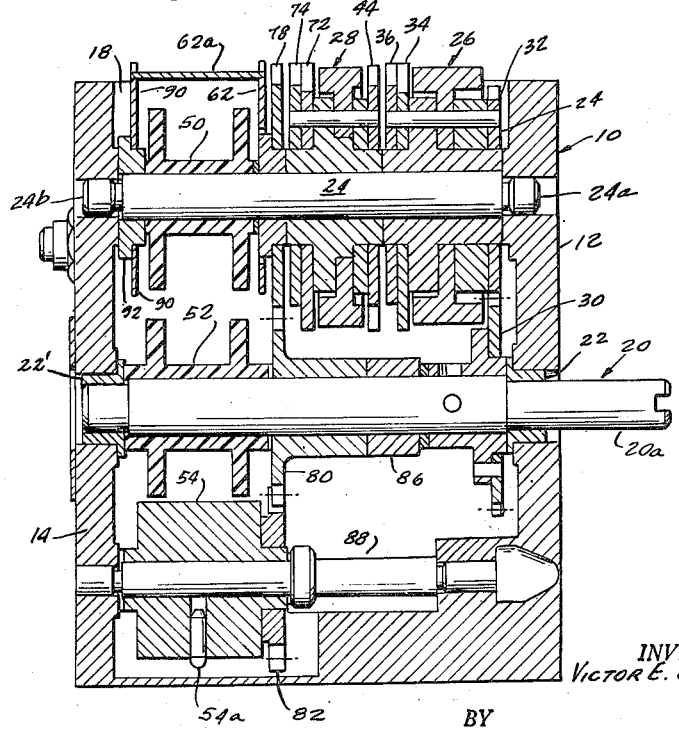
INVENTOR.
Victor E. Carbonara
BY
Ostrolenk & Faber
ATTORNEYS April 8, 1958 V. E. CARBONARA 2,829,833
AZIMUTH COUNTER
Filed Jan. 13, 1954 4 Sheets-Sheet 3
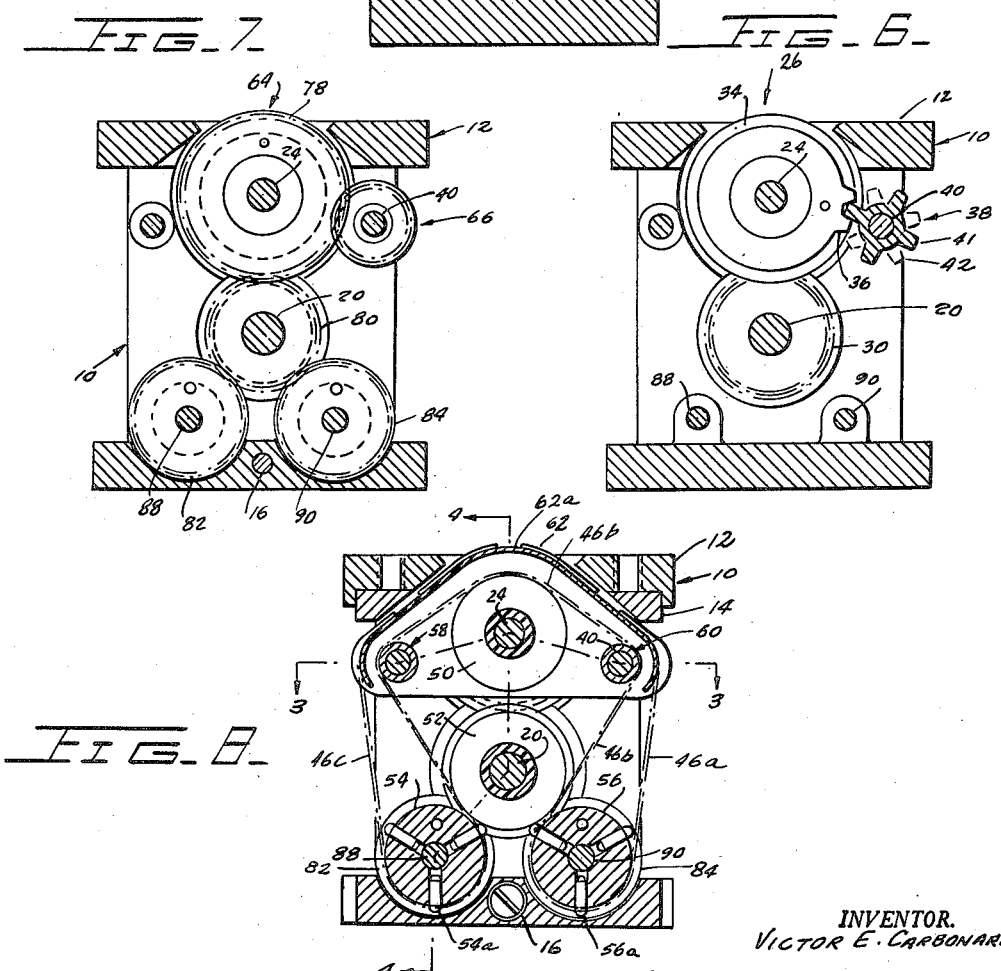
INVENTOR.
VICTOR E. CARBONARA
BY
Ostrolenk & Faber
ATTORNEYS April 8, 1958

V. E. CARBONARA 2,829,833

AZIMUTH COUNTER

Filed Jan. 13, 1954

INVENTOR.
VICTOR E. CARBONARA

Ostroleak
& Faber
ATTORNEYS

United States Patent Office 2,829,833
Patented Apr. 8, 1958

2,829,833

AZIMUTH COUNTER

Victor E. Carbonara, Manhasset, N. Y., assignor to Kollsman Instrument Corporation, Elmhurst, N. Y., a corporation of New York Application January 13, 1954, Serial No. 403,739

3 Claims. (Cl. 235—115)

My present invention relates to measuring and indicating devices and more particularly to automatic counting mechanisms facilitating angular measurement and recording of headings or bearings relative to a reference direction.

In the construction of navigation, tracking and like equipment, it is often necessary to measure a heading relative to true north, the angle in degrees formed by the line of sight and the true meridian passing through the observer's position being commonly referred to as the "azimuth." Difficulty has been encountered in the design of appropriate mechanisms for this purpose, especially when considering that many installations are on moving craft. The problem becomes still more complicated due to the relatively rigid operational requirements imposed, such as the need for precision setting and facility for quick and accurate reading.

Accordingly, it is an object of the present invention to provide a novel measuring instrument obviating one or more of the aforesaid difficulties.

More specifically, my invention is directed to a device wherein a counter is so arranged that a substantial number of indicia (for instance 35 indicia) may be presented successively to view in a particular area without the need for large diameter rollers and utilizing a flexible member or tape guided by relatively small rollers preferably of the dimension utilized for adjacent and related indicia-carrying elements having a smaller number of indicia (for instance 10) arranged for successive presentation in the same space.

Particularly, my invention contemplates the provision of a novel and rugged azimuth determining instrument which closely follows and accurately measures changes in heading or bearing, yet is of simplified construction and capable of being easily read.

Resort to counters has been suggested to meet the aforementioned requirements. However, the mechanisms heretofore designed have been prohibitively complex. For example, a drum-type counter intermittently driven by gearing may be adapted to measure azimuth increments. In such prior counters, separate drums are provided for measuring decimals, units, tens, and hundreds. However, a special interrelation between the tens and hundreds drum is necessary to enable return of the counter to a zero reading from an azimuth reading of 359 degrees 59 minutes or of 359.9° depending on the type of calibration used.

It is another object of my invention, therefore, to provide a novel drum-type counter for precise measurement of azimuth readings which does not necessitate complex mechanisms for the purposes of indication and recording.

Specifically, it is a feature of the present invention to provide an azimuth indicating instrument of the counter type which may be cleared from a maximum azimuth reading to a zero reading without the necessity of complex mechanisms.

The above and still further objects and advantages of the present invention will be best understood by reference to the following detailed description of an illustrative embodiment when taken in conjunction with the accompanying drawings wherein:

Figure 3 is a horizontal sectional view taken along the line 3—3 of Figure 8.

Figure 4 is a vertical section of the indicator taken along the line 4—4 of Figure 8.

Figure 5 is a sectional view taken along the lines 5—5 of Figure 3 and showing the details of the drive for the decimal indicator drum.

Figure 6 is a sectional view taken along the line 6—6 of Figure 3 and showing the details of the transfer mechanism between the decimal indicator drum and the unit indicator drum.

Figure 7 is a sectional view taken along the line 7—7 of Figure 3 and showing the details of the transfer mechanism intermediate the unit indicator drum and the tens and hundreds indicator tape.

Figure 8 is a sectional view taken along the line 8—8 of Figure 3 and showing the details of the drive and guide mechanisms for the tens and hundreds indicator tape.

Figure 1:
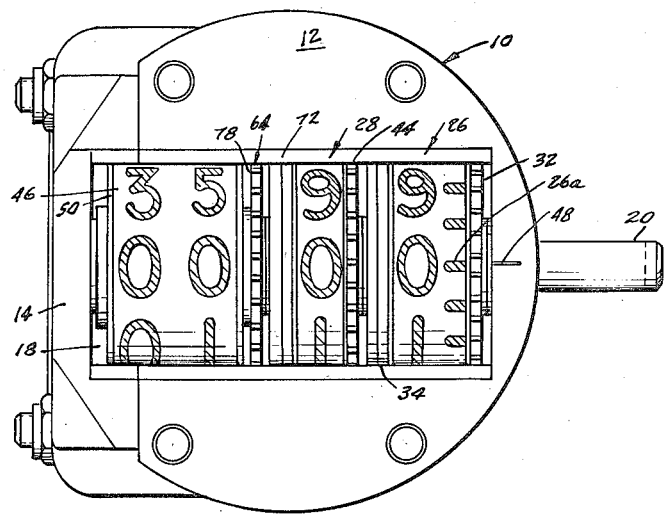
Figure 1 is a top plan view of an azimuth indicator embodying features of the present invention.

Referring now specifically to the drawings, the azimuth indicator of the present invention has a bipartite housing 10 including a body 12 and an end wall 14 secured together by appropriate bolts 16 and formed with a rectangular window 18 in the upper face thereof. Traversing the housing is a horizontally extending input shaft 20 which is appropriately journalled by bearings 22, 22' for rotary movement, the end 20a of the shaft 20 projecting exteriorly of the housing for connection to a suitable drive, such as the output of a tracking mechanism. Spaced above and substantially parallel to the input shaft 20 is a common drum shaft 24 including bearing ends 24a, 24b suitably journalled in the opposite walls of the housing 10. Independently journalled on the drum shaft 24 are the indicator drums, namely the decimal indicator drum 26, and the unit indicator drum 28. The drum 26 is shown as a decimal drum, although it may be calibrated from 0 to 59 (in minutes) where desired as an alternative to a calibration for decimals from .0 to .9.

Interconnected between the drive or input shaft 20 and the decimal indicator drum 26 there is gearing including a decimal drive wheel 30 and a meshing decimal driven wheel 32 for imparting the rotary movement of the input shaft 20 to the decimal indicator drum 26.

As best seen in Figure 1, the periphery of the unit indicator drum 26 is provided with successive numerals from zero to nine with appropriate markers 26a. Owing to the type of coupling between the input shaft 20 and the decimal indicator drum 26, each of the markers 26a corresponds to one-tenth of the drum 26 and indicates .1 increments of azimuth.

Interconnected between the decimal indicator drum 26 and the unit indicator drum 28 is an appropriate transfer mechanism for indexing the unit indicator drum through one-tenth of its cycle in response to completion of a single cycle of the decimal indicator drum under control of the input shaft 20.

Specifically, the transfer mechanism, which is intermittently operable, includes a coupling disc 34 fixed to the face of the drum 26 opposite the face carrying the decimal drive wheel 32, the coupling disc 34 being provided with an appropriate pair of sector teeth 36 at a predetermined peripheral location. Adjacent to the coupling disc 34 is an intermittently advanced transfer pinion 38 journalled on an appropriate transfer shaft 40 which is arranged parallel to the input shaft 20 and the drum shaft 24.

As seen best in Figures 3 and 6, the transfer pinion 38 includes a segmental tooth wheel or part 41 and a unit drive wheel or part 42, the tooth wheel and the drive wheel being formed integral with each other or secured together. The unit drive wheel 42 meshes with a unit driven wheel 44 which is fixed to the adjacent face of the unit drum 28 and transfers appropriate motion to the unit indicator drum 28 upon meshing of the pair of sector teeth 36 with the segmental tooth wheel 41 of the transfer pinion 38.

The unit indicator drum 28 includes appropriate consecutive numerals from zero to nine indicating unit increments of azimuth, the unit indicator drum 28 being advanced through one-tenth of a complete cycle in response to the completion of a cycle of the decimal indicator drum 26, advancing being accomplished via the intermittently operable gear chain including the coupling disc 34, the transfer pinion 38 and the unit driven wheel 34.

Extending longitudinally of the housing 10 in substantial side-by-side relation with the decimal and unit indicator drums 26, 28 is a continuous tens and hundreds indicator tape 46 which is mounted for movement along a predetermined guide path relative to the common reference 48 on the housing 10 seen in Figure 1. The indicator tape 46 is provided with consecutive rows of hundreds and tens numbers, running from 0 to 35, adapted to be aligned with the numerals of the decimal and unit indicator drums 26, 28 and the reference location or marker 48 to indicate the various readings.

Figure 9:
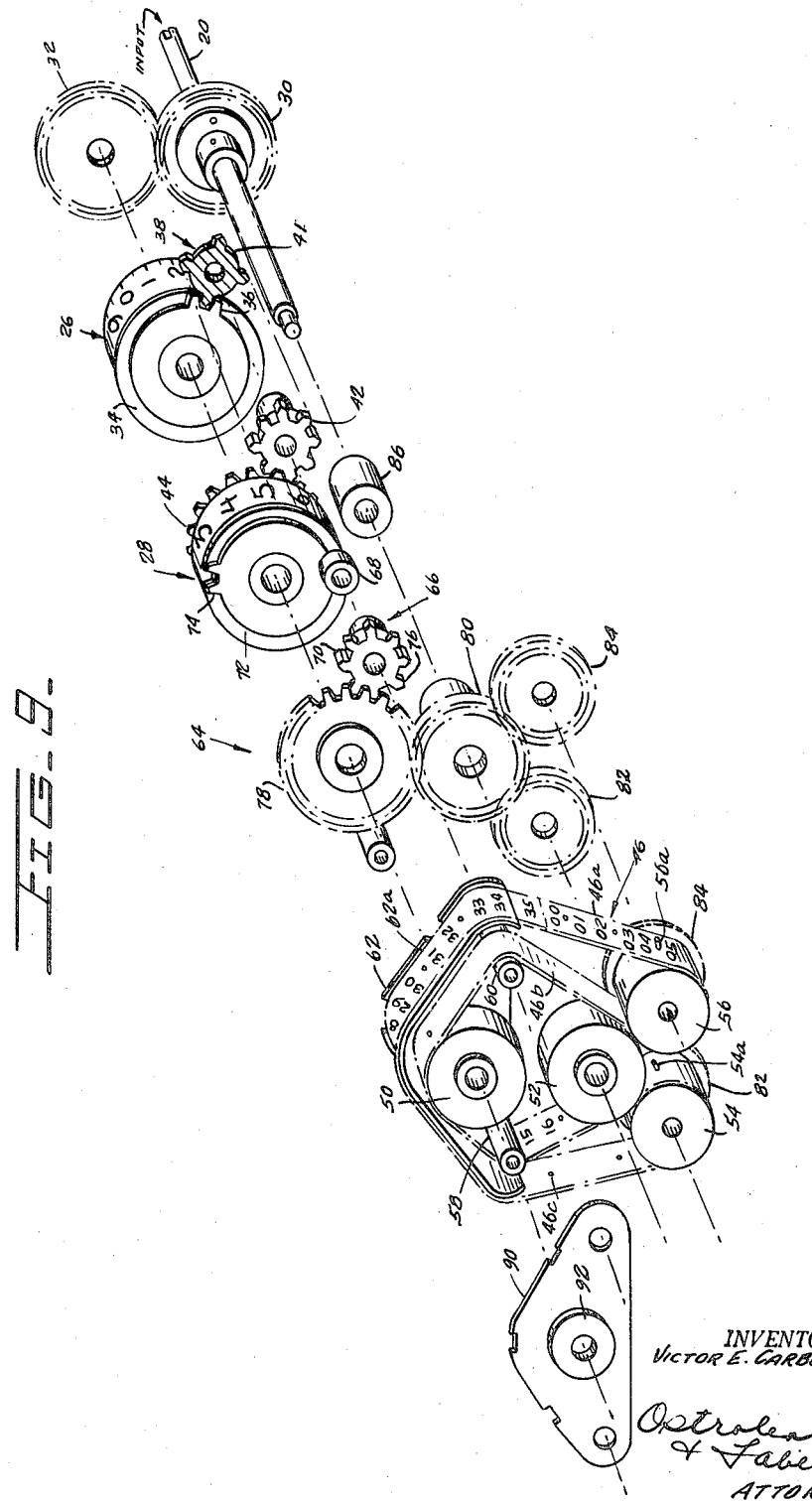
Figure 9 is an exploded perspective view showing the various components of the azimuth indicator embodied in Figures 1 to 8.

Suitable means are arranged to define the continuous guide path for the tape 46 which is preferably supported in the form of two curved runs as seen best in Figure 9 and designated by the letters 46a, 46b nested within each other. The guide path is defined by an idler roller or spool 50 loosely journalled on the drum shaft 24 and over which the inner run 46b of the tape 46 passes; a further idler roller or drum 52 arranged below the idler roller 50 and independently journalled on the input shaft 20 and on opposite sides of which the extremities of the inner curved run 46b pass; sprocket drive wheels 54, 56 journalled in a manner to be described, and about which the tape passes intermediate the outer and inner runs 46a, 46b; guide pins 58, 60 about which the tape passes intermediate the upper idler 50 and the lower idler roller 52, the latter being arranged in cooperating relation with the sprocket wheels 54, 56; and the guide table or canopy 62 which overlies the arrangement of the idler roller 50 and the guide pins 58, 60 and formed with the curved bed 62a receiving the outer run 46a of the tape 46.

Figure 2:
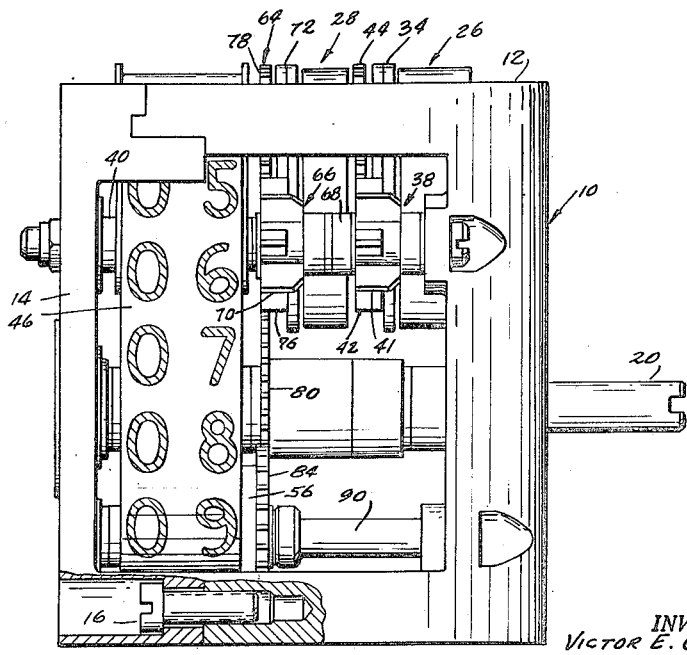
Figure 2 is an elevational view of the indicator shown in Figure 1 with parts broken away and sectioned.

As seen best in Figures 1 and 2, the canopy 62 is arranged to substantially coextend with the peripheral portion of the respective decimal and unit indicator drums 26, 28 so that the tens and hundreds tape 46 may be positioned in appropriate side-by-side relation relative to the numerals of the indicator drums 26, 28.

Interconnected between the unit indicator drum 28 and the indicator tape 46 there is provided an appropriate intermittently operable transfer mechanism 64 for advancing the indicator tape 46 in dependence upon the advancing of the unit indicator drum 28, specifically upon completion of a cycle indicating ten unit increments of azimuth. The intermittent rotary transfer mechanism 64 includes a transfer pinion 66 independently journalled on the transfer shaft 40 and positioned relative to the decimal unit pinion 42 by a spacer sleeve 68. The transfer pinion 66 includes a segmental toothed gear or part 70 intermittently meshing with the periphery spaced sector teeth 74 of the unit coupling disc 72 and a tens, hundreds drive wheel 76 meshing with a driven gear 78.

The driven gear 78 of the transfer mechanism 64 is independently journalled on the drum shaft 24 intermediate the guide or idler roller 50 and the unit drum 28. As best seen in Figures 7 and 8, the driven gear 78 is coupled via an intermediate gear 80 to respective sprocket gears 82, 84 fixed to the sprocket wheels 54, 56. The intermediate coupling gear 80 is independently journalled on the input shaft 20 and appropriately positioned relative to the decimal drive wheel or gear 30 by an interposed spacer sleeve 86, while the sprocket drive gears 82, 84 are each independently journalled on spaced stub shafts 88, 90.

At spaced peripheral locations, the sprocket wheels 54, 56 are provided with radially projecting sprocket teeth 54a, 56a interengaged within sprocket holes 46c at longitudinally spaced intervals of the continuous tape 46. Accordingly, upon completion of a complete cycle of the unit indicator 28, the intermittent rotary mechanism operates via the pinion 66, the driven gear 78, the coupling gear 80, the sprocket drive gears 84, 88 and the sprocket drives 54, 56 to appropriately advance the tens hundreds indicator tape.

Interposed between the end wall 14 of the housing and the ends of the guide pins or rollers 58, 60 and the idler roller 50 there is a face plate 90 provided with an appropriate bearing seat 92 for the adjacent end of the drum shaft 24. The exceptionally compact arrangement described embodies the facility of a drum-type counter for accurate azimuth increment readings without the necessity of complex mechanisms for return to zero reading.

Under actual operating conditions the counter can be utilized substantially as follows.

The input shaft 20 of the azimuth counter is connected to appropriate drive mechanisms of the system for which azimuth readings are to be derived. Thereupon, rotary movement of the shaft in either the forward direction or the reverse direction causes corresponding increments of azimuth to be registered on the decimal indicator drum 26. Although the operation will be described for advancing inputs only, it is to be expressly understood that the device operates in substantially the same manner when, during a given period of measurement, the input shaft 20 reverses direction.

Upon completion of a cycle of the drum 26 indicating ten decimal increments of azimuth corresponding to 1°, the transfer mechanism via the pinion 42 advances the unit indicator drum 28 one step. Thereupon, and upon completion of the cycle of unit indicator drum 28, indicating 10°, the intermittently operable transfer mechanism 64 for the tens-hundreds tape is operated to cause the tens-hundreds tape to advance one step under control of the sprocket drive wheels 54, 56 to indicate a change in azimuth of 10°. After continuous input for an appropriate period, the device may reach a reading of 359.9° whereupon the drive mechanism 64 advances the continuous tape 46 from the reading "35" to the "0" reading, the latter position being shown in Figure 1.

From the foregoing it can be seen that the mechanisms of the present invention make possible the employment of drum-type counters in navigational and similar systems for the purposes of registering angular measurements and headings. It is to be expressly noted that numerous other applications are contemplated wherein it is necessary to operate on the basis of a measuring scale that does not proceed only by increments of 10 as is encountered in conventional continuously counting devices.

In the foregoing I have described my invention solely in connection with specific illustrative embodiments thereof. Since many variations and modifications of the invention will now be obvious to those skilled in the art, I prefer to be bound not by the specific disclosures herein contained but only by the appended claims.

I claim:
1. An automatic counter comprising a first indicator drum mounted for rotation about an axis and adapted to be operatively connected to an input shaft, a second indicator drum mounted for rotation about said axis and advanced relative to a reference in response to completion of the counting cycle of said first indicator drum, intermittently operative rotary mechanisms coupling said first and second indicator drums, a continuous indicator tape mounted for movement along a predetermined path and advanced relative to said reference in response to completion of the counting cycle of said second indicator drum, further intermittently operative rotary mechanisms coupling said second indicator drum and said indicator tape, and means defining said predetermined path for said indicator tape, the means defining said predetermined path being arranged to provide two curved runs of indicator tape one within the other and including an idler roller rotatable about said axis and over which the inner run of said indicator tape passes, a pair of sprocket wheels forming part of said further intermittently operative rotary mechanisms and about which said indicator tape is drivingly engaged between said inner and outer runs, and a guide table overlying said idler roller and providing a curved bed over which the outer run of said indicator tape passes.

2. In an automatic azimuth counter including decimal and unit indicator drums independently journalled for rotation about a common axis, transfer means interconnected between indicator drums for intermittently advancing said unit indicator drum in dependence upon the input to said decimal indicator drum, a continuous tens and hundreds indicator tape movable relative to a reference point and having indications from 00 to 35, further transfer means interconnected between said unit indicator drum and said indicator tape for intermittently advancing said indicator tape in dependence upon advancing of said unit indicator drum, and means defining a continuous guide path for said indicator including curved runs nested one within the other, including an input shaft, means gearing said shaft to said decimal indicator drum; said input shaft extending parallel to said common axis of said drums into the plane of curvature of the curved runs of said tape; and an idler carried on said input shaft and engaging said tape.

3. In a device as set forth in claim 1, including an input shaft, means gearing said shaft to said decimal indicator drum; said input shaft extending parallel to said common axis of said drums into the plane of curvature of the curved runs of said tape, and an idler carried on said input shaft and engaging said tape.

References Cited in the file of this patent
UNITED STATES PATENTS

| | | |
|---|---|---|
| 446,753 | Jewitt | Feb. 17, 1891 |
| 644,967 | Byrne | Mar. 6, 1900 |
| 776,616 | Rainey | Dec. 6, 1904 |
| 1,497,045 | Tillman | June 10, 1924 |
| 1,920,173 | Griffith | Aug. 1, 1933 |
| 2,567,942 | Kass et al. | Sept. 18, 1951 |